United States Patent
Ballard

(10) Patent No.: US 7,825,071 B2
(45) Date of Patent: Nov. 2, 2010

(54) HIGHLY BRANCHED POLYMERIC MATERIALS AS SURFACTANTS FOR OIL-BASED MUDS

(75) Inventor: David Antony Ballard, Aberdeenshire (GB)

(73) Assignee: M-I L.L.C., Houston, TX (US)

( * ) Notice: Subject to any disclaimer, the term of this patent is extended or adjusted under 35 U.S.C. 154(b) by 541 days.

(21) Appl. No.: 11/765,895

(22) Filed: Jun. 20, 2007

(65) Prior Publication Data

US 2007/0293401 A1    Dec. 20, 2007

Related U.S. Application Data

(60) Provisional application No. 60/805,250, filed on Jun. 20, 2006.

(51) Int. Cl.
*C09K 8/02* (2006.01)
*C09K 8/60* (2006.01)
*C09K 8/512* (2006.01)
*E21B 21/00* (2006.01)

(52) U.S. Cl. ............... 507/103; 507/219; 507/903; 175/65

(58) Field of Classification Search ............ 507/103, 507/219, 903; 175/65
See application file for complete search history.

(56) References Cited

U.S. PATENT DOCUMENTS

| | | | |
|---|---|---|---|
| 3,975,348 A * | 8/1976 | Christena | 523/502 |
| 5,330,662 A | 7/1994 | Jahnke et al. | |
| 6,392,006 B1 * | 5/2002 | Van Benthem et al. | 528/291 |
| 6,784,267 B1 * | 8/2004 | Ward et al. | 526/311 |
| 6,887,832 B2 | 5/2005 | Kirsner et al. | |
| 6,964,940 B1 | 11/2005 | Treybig et al. | |
| 2004/0163995 A1 * | 8/2004 | Cornelisse | 208/48 AA |
| 2006/0258543 A1 * | 11/2006 | Saini | 507/219 |

FOREIGN PATENT DOCUMENTS

| EP | 0835896 A1 | 4/1998 |
|---|---|---|
| WO | 2006/120422 A1 | 11/2006 |

OTHER PUBLICATIONS

International Search Report issued in International Application No. PCT/US2007/071336 dated Nov. 19, 2007 (3 pages).
Written Opinion issued in International Application No. PCT/US2007/071336 dated Nov. 19, 2007 (4 pages).
Extended European Search Report issued in EP Application No. 07798636.2 dated Aug. 20, 2009 (7 pages).
Office Action issued in European Application No. 07798636.2 dated Sep. 7, 2010 (5 pages).

* cited by examiner

*Primary Examiner*—Timothy J. Kugel
*Assistant Examiner*—Aiqun Li
(74) *Attorney, Agent, or Firm*—Osha • Liang LLP

(57) ABSTRACT

A wellbore fluid that includes an oleaginous continuous phase; a non-oleaginous phase; and a modified polyesteramide surfactant; methods of formulating such wellbore fluid; and methods of drilling a subterranean formation with such wellbore fluid are disclosed.

18 Claims, No Drawings

HIGHLY BRANCHED POLYMERIC MATERIALS AS SURFACTANTS FOR OIL-BASED MUDS

CROSS-REFERENCE TO RELATED APPLICATIONS

This applications claims priority, pursuant to 35 U.S.C. §119, to U.S. Patent Application Ser. No. 60/805,250 filed on Jun. 20, 2006, which is herein incorporated by reference in its entirety.

BACKGROUND OF INVENTION

1. Field of the Invention

The invention relates generally to wellbore fluids and polymeric surface active agents for use in a wellbore fluid.

2. Background Art

When drilling or completing wells in earth formations, various fluids typically are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

Many types of fluids have been used in well bores particularly in connection with the drilling of oil and gas wells. The selection of an oil-based well bore fluid involves a careful balance of the both the good and bad characteristics of such fluids in a particular application. The primary benefits of selecting an oil-based drilling fluid include: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art. An especially beneficial property of oil-based muds is their excellent lubrication qualities. These lubrication properties permit the drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water based muds are used. In contrast oil-based muds provide a thin, slick filter cake which helps to prevent pipe sticking and thus the use of the oil-based mud can be justified.

Despite the many benefits of using oil-based muds, they have disadvantages. In general, the use of oil-based drilling fluids and muds has high initial and operational costs. These costs can be significant depending on the depth of the hole to be drilled. However, often the higher costs can be justified if the oil-based drilling fluid prevents the caving in or hole enlargement which can greatly increase drilling time and costs.

In general, drilling fluids should be pumpable under pressure down through strings of drilling pipe, then through and around the drilling bit head deep in the earth, and then returned back to the earth surface through an annulus between the outside of the drill stem and the hole wall or casing. Beyond providing drilling lubrication and efficiency, and retarding wear, drilling fluids should suspend and transport solid particles to the surface for screening out and disposal. In addition, the fluids should be capable of suspending additive weighting agents (to increase specific gravity of the mud), generally finely ground barites (barium sulfate ore), and transport clay and other substances capable of adhering to and coating the borehole surface.

Drilling fluids are generally characterized as thixotropic fluid systems. That is, they exhibit low viscosity when sheared, such as when in circulation (as occurs during pumping or contact with the moving drilling bit). However, when the shearing action is halted, the fluid should be capable of suspending the solids it contains to prevent gravity separation. In addition, when the drilling fluid is under shear conditions and a free-flowing near-liquid, it must retain a sufficiently high enough viscosity to carry all unwanted particulate matter from the bottom of the well bore to the surface. The drilling fluid formulation should also allow the cuttings and other unwanted particulate material to be removed or otherwise settle out from the liquid fraction.

There is an increasing need for drilling fluids having the rheological profiles that enable these wells to be drilled more easily. Drilling fluids having tailored Theological properties ensure that cuttings are removed from the wellbore as efficiently and effectively as possible to avoid the formation of cuttings beds in the well which can cause the drill string to become stuck, among other issues. There is also the need from a drilling fluid hydraulics perspective (equivalent circulating density) to reduce the pressures required to circulate the fluid, this helps to avoid exposing the formation to excessive forces that can fracture the formation causing the fluid, and possibly the well, to be lost. In addition, an enhanced profile is necessary to prevent settlement or sag of the weighting agent in the fluid, if this occurs it can lead to an uneven density profile within the circulating fluid system which can result in well control (gas/fluid influx) and wellbore stability problems (caving/fractures).

To obtain the fluid characteristics required to meet these challenges the fluid must be easy to pump, so it requires the minimum amount of pressure to force it through restrictions in the circulating fluid system, such as bit nozzles or downhole tools. Or in other words the fluid must have the lowest possible viscosity under high shear conditions. Conversely, in zones of the well where the area for fluid flow is large and the velocity of the fluid is slow or where there are low shear conditions, the viscosity of the fluid needs to be as high as possible in order to suspend and transport the drilled cuttings. This also applies to the periods when the fluid is left static in the hole, where both cuttings and weighting materials need to be kept suspended to prevent settlement. However, it should also be noted that the viscosity of the fluid should not continue to increase under static conditions to unacceptable levels otherwise when the fluid needs to be circulated again this can lead to excessive pressures that can fracture the formation or alternatively it can lead to lost time if the force required to regain a fully circulating fluid system is beyond the limits of the pumps.

Basic invert emulsion fluid chemistry has not radically changed since its introduction; the same basic types of surfactants (amido-amines) and viscosifiers (organoclays) are still used with their associated issued. For example, the strongly wetting nature of amido-amine can cause the system to become over-dispersed, which results in a loss of viscosity.

Accordingly, there exists a continuing need for improved drilling materials and fluids.

SUMMARY OF INVENTION

In one aspect, embodiments disclosed herein relate to a wellbore fluid that includes an oleaginous continuous phase; a non-oleaginous phase; and a modified polyesteramide surfactant.

In another aspect, embodiments disclosed herein relate to a method of drilling a subterranean hole with an invert emulsion drilling fluid, that includes mixing an oleaginous fluid, a non-oleaginous fluid, and a modified polyesteramide surfactant, to form an invert emulsion, wherein the surfactant is present in an amount sufficient to form an invert emulsion in which the oleaginous fluid is the continuous phase and the non-oleaginous fluid is the discontinuous phase; and drilling said subterranean hole using said invert emulsion as the drilling fluid.

In yet another aspect, embodiments disclosed herein relate to a method of formulating an invert emulsion drilling fluid, that includes mixing an oleaginous fluid, a non-oleaginous fluid, a and a modified polyesteramide surfactant, wherein the surfactant is present in an amount sufficient to form an invert emulsion in which the oleaginous fluid is the continuous phase and the non-oleaginous fluid is the discontinuous phase.

Other aspects and advantages of the invention will be apparent from the following description and the appended claims.

DETAILED DESCRIPTION

In one aspect, embodiments disclosed herein relate to surface active agents for wellbore fluids. In particular, embodiments disclosed herein relate to branched polyesteramide surface active agents. The polyesteramide-containing surface active agents may include modified polyesteramides. As used herein, "modified polyesteramides" may include polyesteramides modified by at least one of functionalization and crosslinking.

In one embodiment, the polyesteramide may include a highly branched macromolecule prepared by polycondensation of cyclic anhydrides with aminodiols where the branches are terminated by tertiary amine end groups. The hyperbranched polyesteramide may have a molecular weight of from about 300 to about 30,000 in one embodiment, from about 500 to about 10,000 in another embodiment; and from about 1,000 to about 3,000 in yet another embodiment. The hyperbranched polyesteramide may have from about 2 to about 20 tertiary amine end groups in one embodiment; from about 3 to about 15 tertiary amine end groups in another embodiment; and from about 4 to about 10 tertiary amine end groups in yet another embodiment.

In one embodiment, the polyesteramide compounds that may be used in embodiments disclosed herein include polycondensates of a cyclic anhydride and an aminodiol. Cyclic anhydrides that may be used to form a polyesteramide as disclosed herein include standard anhydrides and functional anhydrides, such, for example, glutaric anhydride, 2,2-dimethyl glutaric anhydride, 3,3-dimethylglutaric anhydride, maleic anhydride, hexahydrophthalic anhydride, phthalic anhydride, succinic anhydride, alkenylsuccinic anhydrides, and poly(alkenyl)succinic anhydrides. Aminodiols that may be used to form a polyesteramide as disclosed herein include for example, aminodiols having a straight-chain or branched alkanol group having 1 to 30 carbon atoms, such as, dimethanolamine, diethanolamine, dipropanolamine, diisopropalamine, dibutanolamine, methanolethanolamine, methanolpropanolamine, methanolbutanolamine, ethanolpropanolamine, ethanolbutanolamine, and propanolbutanolamine, etc One example of polyesteramide compounds suitable for embodiments disclosed herein include those formed by the polycondensation reactions shown below:

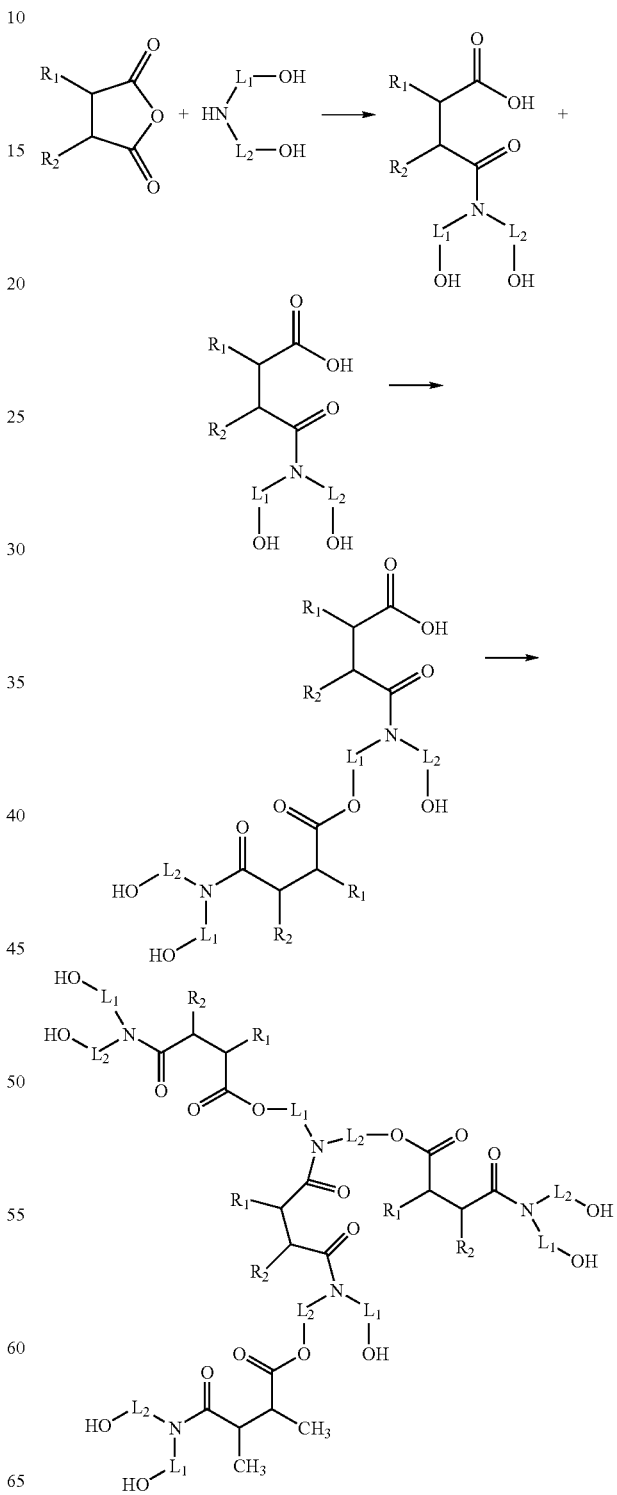

wherein $R_1$ and $R_2$ may be independently H or $C_1$-$C_{20}$ alkyl, or $R_1$ and $R_2$ taken together form a $C_5$-$C_8$ cycloalkyl or phenyl, which may be optionally substituted; and $L_1$ and $L_2$ are independently $C_1$-$C_{30}$ alkyl. One of ordinary skill in the art would recognize that the above shown product may undergo additional polycondensations to achieve a greater amount of branching in the polyesteramide.

In another embodiment, the polyesteramide may include compounds represented by the general formula:

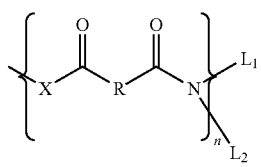

wherein R may be selected from a straight or branched chain or cyclic aliphatic group and an aromatic group; X may be selected from N and O; $L_1$ and $L_2$ are independently $C_1$-$C_{30}$ aliphatic groups; and n may range from 2 to 50.

In one embodiment, the polyesteramides disclosed herein may contain end group modification. For example, end groups of the polyesteramides may be optionally functionalized depending upon the desired application of the polyesteramides. In one embodiment, end groups may be functionalized to facilitate crosslinking between the multiple polyesteramide molecules. In another embodiment, end groups may be functionalized to increase the lipophilicity of the polyesteramide. The degree of end group functionalization may vary from at least some functionalization to total functionalization. End group functionalization may include for example, aliphatic and aromatic carboxylic ester end groups, unsaturated fatty acid ester end groups, tertiary amine end groups, acrylate and methacrylate ester end groups, carboxylic acid end groups, trialkoxysilane end groups, polyethylene oxide end groups, and epoxy end groups.

On example of polyesteramides that may be used in the embodiments disclosed herein include compounds sold under the trade name HYBRANE®, which are commercially available from DSM Hybrane (Beek, Netherlands) Specific examples of HYBRANE® dendrimers that are commercially available are H1500 (unmodified), HS4700 (50 percent modified with stearic acid) and PS2550 (100 percent modified with stearic acid).

In another embodiment, the polyesteramides disclosed herein may be modified via crosslinking. In one embodiment, the polyesteramides disclosed herein may be crosslinked to render a larger polymeric material that may be used as a surface active agent. One of ordinary skill in the art would recognize that the selection of a crosslinking agent may depend upon functionalization of the end groups of the polyesteramide. In one embodiment, the polyesteramide may be crosslinked by at least one of epoxidized oils, such as, for example epoxidized soya oil, epoxidized cashew nut oil, other epoxidised natural oils, or derivatives thereof, bisphenol, and novolak. In crosslinking the polyesteramides disclosed herein, it may also be desirable to vary the reaction conditions, such as by adding a strong base which may hydrolyze the epoxidized oils to create an amphoteric nature to the polymer by creating anionic carboxylate groups on the polymer.

In another embodiment, the crosslinking agent may include ethylene glycol diglycidyl ether, propylene glycol diglycidyl ether, butylene glycol diglycidyl ether, aziridine derivatives, epoxy functionalized polyalkalene glycols, an oxidized starch (polymeric dialdehyde), and combinations thereof In other embodiments, the crosslinking agent may include an acetal that can be hydrolized to produce an aldehyde in situ. For example, the crosslinking agent may include an aldehyde adduct, a tetra methoxy propane, or the bisulphite addition compounds of the aldehydes. For example, a formaldehyde adduct may be formed by reacting formaldehyde and a compound selected from sulfurous acid and its water soluble salts, such as the alkali metal salts (e.g., sodium or potassium salts). In one embodiment, the salt used may be sodium bisulfite. In addition to using the alkali metal salts, ammonium and tertiary amine salts of sulfurous acid such as ammonium bisulfite or trimethylamine sulfite may be used to form an adduct.

In other embodiments, the crosslinking agent may be a diepoxide or a triepoxide. In yet other embodiments, the crosslinking agent may include trimethylolpropane triglycidyl ether, diglycidyl ether of meopentyl glycol, epoxidized 1,6-hexanediol, 1,4-butanediol diglycidyl ether (BDDGE), 1,2,7,8-diepoxyoctane, 3-(bis(glycidoxymethyl)-methoxy)-1,2-propanediol, 1,4-cyclohexanedimethanol diglycidyl ether, 4-vinyl-1-cyclohexane diepoxide, 1,2,5,6-diepoxycyclooctane, and bisphenol A diglycidyl ether, or combinations thereof.

One of skill in the art should appreciate that the molar equivalent ratio of the polyesteramide compound to the selected cross-linking agent ("PEA:CA ratio") will affect the extent of crosslinking achieved between the polyesteramide compound and the crosslinking agent. Such a skilled person will appreciate that in a stoichiometrically balanced equation, two amide(amine) molar equivalents are coupled together by one crosslinking molar equivalent. Through routine variation of the PEA:CA molar equivalent ratio, one of skill in the art should be easily able to determine the proper molar equivalent ratio to obtain a desired viscosity. One of skill in the art should appreciate that a minimally crosslinked polymer with high fluidity (i.e., low viscosity) will be achieved using a high PEA:CA molar equivalent ratio. For example, a PEA:CA ratio greater than 50:1 forms a polymer with minimal crosslinking and thus very minimal change in viscosity from the non-crosslinked polyesteramide. On the other hand, a very low PEA:CA ratio, for example 10:1 should provide a high level of crosslinking and thus a more viscous fluid. In one embodiment, the PEA:CA ratio should be selected so that only partial polymerization occurs.

One of skill in the art will also understand that factors such as pH and temperature may have a significant impact upon the speed of reaction. Through systematic experimentation, one of skill in the art will be able to determine the ideal conditions to achieve a predetermined result, be it a gel-like fluid or solid-, waxy-like material, or solid hard material. It should also be appreciated that for oil-field applications, it is possible to optimize the reaction conditions, such as pH, concentration of reactants, temperature, etc, to produce a polymer with a definable set time.

In one embodiment, the reaction of the polyesteramide compounds and the crosslinking agents may be carried out using a suspension polymerization technique. In suspension polymerization, the polymer is prepared in a carrier fluid. Typically, the monomers are soluble in the carrier fluid and are stabilized in the carrier fluid before and during the polymerization by the use of surfactants.

In a particular embodiment, polyesteramide surface active agents may be included as a surfactant in a wellbore fluid. The wellbore fluids may include an oleaginous continuous phase, a non-oleaginous discontinuous phase, and a modified polyesteramide surfactant. One of ordinary skill in the art would appreciate that the polyesteramides may be modified as disclosed herein in accordance with the desired application. For example, modifications may include functionalization of the polyesteramide chain or end groups and/or crosslinking.

The oleaginous fluid may be a liquid and more preferably is a natural or synthetic oil and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus in one embodiment the amount of non-oleaginous fluid is less that about 70% by volume and preferably from about 1% to about 70% by volume. In another embodiment, the non-oleaginous fluid is preferably from about 5% to about 60% by volume of the invert emulsion fluid. The fluid phase may include either an aqueous fluid or an oleaginous fluid, or mixtures thereof In a particular embodiment the polyesteramide-coated solid materials may be included in a wellbore fluid comprising an aqueous fluid that includes at least one of fresh water, sea water, brine, and combinations thereof The fluids disclosed herein are especially useful in the drilling, completion and working over of subterranean oil and gas wells. In particular the fluids disclosed herein may find use in formulating drilling muds and completion fluids that allow for the easy and quick removal of the filter cake. Such muds and fluids are especially useful in the drilling of horizontal wells into hydrocarbon bearing formations.

Conventional methods can be used to prepare the drilling fluids disclosed herein in a manner analogous to those normally used, to prepare conventional oil-based drilling fluids. In one embodiment, a desired quantity of oleaginous fluid such as a base oil and a suitable amount of polyesteramide surfactact are mixed together and the remaining components are added sequentially with continuous mixing. An invert emulsion may be formed by vigorously agitating, mixing or shearing the oleaginous fluid and the non-oleaginous fluid.

Other additives that may be included in the wellbore fluids disclosed herein include for example, weighting agents, wetting agents, organophilic clays, viscosifiers, fluid loss control agents, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Advantageously, embodiments disclosed herein provide for at least one of the following. The nature of the compounds disclosed herein may allow for ease in tailoring the chemical properties of the compounds depending upon a desired application. Wellbore fluids containing polyesteramide surfactants disclosed herein may provide improved fluid properties, which may result facilitating the drilling process. Additionally reduced formation damage and improved, reuse and recycling of the fluids may be observed when using the fluids disclosed herein. The shape and size of the polyesteramide surfantants may allow for a branched, spherical hydrophilic portion that is larger and/or has a higher molecular weight than the hydrophilic portion of conventional surfactants, and thus may allow for the stronger bonds and less desorption. Additionally, modification of the surfactants may be performed in accordance with the desired application of the fluids.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A wellbore fluid comprising:
   an oleaginous continuous phase;
   a non-oleaginous phase; and
   a modified polyesteramide surfactant crosslinked by a crosslinking agent, wherein the crosslinking agent comprises at least one of an epoxidized oil, epoxidized 1,6-hexanediol, aziridine derivatives, epoxy functionalized polyalkalene glycols, an oxidized starch, a polymeric dialdehyde, an aldehyde adduct, a tetra methoxy propane, and a hydrolized acetal.

2. The wellbore fluid of claim 1, wherein the polyesteramide is a polycondensate of a cyclic anhydride and aminodiol.

3. The wellbore fluid of claim 1, wherein the polyesteramide comprises fatty acid end groups.

4. The wellbore fluid of claim 1, wherein the polyesteramide comprises compounds represented by the general formula:

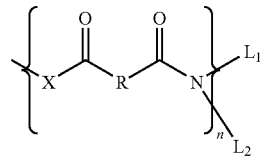

wherein R is selected from a straight or branched chain or cyclic aliphatic group and an aromatic group; X is selected from N and O; $L_1$ and $L_2$ are independently $C_1$-$C_{30}$ aliphatic groups; and n has a value ranging from 2 to 50.

5. The wellbore fluid of claim 1, wherein the oleaginous fluid is selected from diesel oil, mineral oil, synthetic oil, ester oil, glycerides of fatty acids, aliphatic esters, aliphatic ethers, aliphatic acetals, and combinations thereof.

6. The wellbore fluid of claim 1, wherein the non-oleaginous phase is selected from fresh water, sea water, brine, aqueous solutions containing water soluble organic salts, water soluble alcohols or water soluble glycols or combinations thereof.

7. A method of drilling a subterranean hole with an invert emulsion drilling fluid, comprising:

mixing an oleaginous fluid, a non-oleaginous fluid, and a modified polyesteramide surfactant crosslinked by a crosslinking agent, wherein the crosslinking agent comprises at least one of an epoxidized oil, epoxidized 1,6-hexanediol, aziridine derivatives, epoxy functionalized polyalkalene glycols, an oxidized starch, a polymeric dialdehyde, an aldehyde adduct, a tetra methoxy propane,and a hydrolized acetal, to form an invert emulsion, wherein the surfactant is present in an amount sufficient to form an invert emulsion in which the oleaginous fluid is the continuous phase and the non-oleaginous fluid is the discontinuous phase; and drilling said subterranean hole using said invert emulsion as the drilling fluid.

8. The method of claim 7, wherein the polyesteramide is a polycondensate of a cyclic anhydride and aminodiol.

9. The method of claim 7, wherein the polyesteramide comprises fatty acid end groups.

10. The method of claim 7, wherein the polyesteramide comprises compounds represented by the general formula:

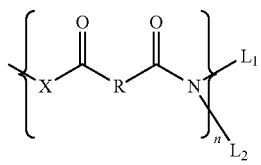

wherein R is selected from a straight or branched chain or cyclic aliphatic group and an aromatic group; X is selected from N and O; $L_1$ and $L_2$ are independently $C_1$-$C_{30}$ aliphatic groups; and n has a value ranging from 2 to 50.

11. The method of claim 7, wherein the oleaginous fluid is selected from diesel oil, mineral oil, synthetic oil, ester oil, glycerides of fatty acids, aliphatic ester, aliphiatic ethers, aliphatic acetals, and combinations thereof.

12. The method of claim 7, wherein the non-oleaginous phase is selected from fresh water, sea water, brine, aqueous solutions containing water soluble organic salts, water soluble alcohols or water soluble glycols or combinations thereof.

13. A method of formulating an invert emulsion drilling fluid, comprising:

mixing an oleaginous fluid, a non-oleaginous fluid, a and a modified polyesteramide surfactant crosslinked by a crosslinking agent, wherein the surfactant is present in an amount sufficient to form an invert emulsion in which the oleaginous fluid is the continuous phase and the non-oleaginous fluid is the discontinuous phase, and wherein the crosslinking agent comprises at least one of an epoxidized oil, epoxidized 1,6-hexanediol, aziridine derivatives, epoxy functionalized polyalkalene glycols, an oxidized starch, a polymeric dialdehyde, an aldehyde adduct, a tetra methoxy propane, and a hydrolized acetal.

14. The method of claim 13, wherein the polyesteramide is a polycondensate of a cyclic anhydride and aminodiol.

15. The method of claim 13, wherein the polyesteramide comprises fatty acid end groups.

16. The method of claim 13, wherein the polyesteramide comprises compounds represented by the general formula:

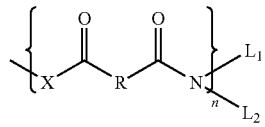

wherein R is selected from a straight or branched chain or cyclic aliphatic group and an aromatic group; X is selected from N and O; $L_1$ and $L_2$ are independently $C_1$-$C_{30}$ aliphatic groups; and n has a value ranging from 2 to 50.

17. The method of claim 13, wherein the oleaginous fluid is selected from diesel oil, mineral oil, synthetic oil, ester oil, glycerides of fatty acids, aliphatic esters, aliphatic ethers, aliphatic acetals, and combinations thereof.

18. The method of claim 13, wherein the non-oleaginous phase is selected from fresh water, sea water, brine, aqueous solutions containing water soluble organic salts, water soluble alcohols or water soluble glycols or combinations thereof.

* * * * *